(12) United States Patent
Ladak et al.

(10) Patent No.: US 9,063,991 B2
(45) Date of Patent: Jun. 23, 2015

(54) METHODS FOR IDENTIFYING UNIQUE ENTITIES ACROSS DATA SOURCES AND DEVICES THEREOF

(71) Applicant: Wipro Limited, Bangalore (IN)

(72) Inventors: Akbar Ladak, Bangalore (IN);
Abhishek Shivkumar, Bangalore (IN);
Harish Vijendran, Bangalore (IN)

(73) Assignee: Wipro Limited, Bangalore (IN)

( * ) Notice: Subject to any disclaimer, the term of this patent is extended or adjusted under 35 U.S.C. 154(b) by 218 days.

(21) Appl. No.: 13/857,380

(22) Filed: Apr. 5, 2013

(65) Prior Publication Data

US 2014/0214868 A1 Jul. 31, 2014

(30) Foreign Application Priority Data

Jan. 25, 2013 (IN) .............................. 345/CHE/2013

(51) Int. Cl.
*G06F 17/30* (2006.01)

(52) U.S. Cl.
CPC .............................. *G06F 17/30557* (2013.01)

(58) Field of Classification Search
None
See application file for complete search history.

(56) References Cited

U.S. PATENT DOCUMENTS

| | | |
|---|---|---|
| 7,792,864 B1 | 9/2010 | Rice |
| 2002/0062368 A1 | 5/2002 | Holtzman et al. |
| 2003/0115164 A1 | 6/2003 | Jeng et al. |
| 2006/0294151 A1 | 12/2006 | Wong et al. |
| 2008/0031493 A1* | 2/2008 | Brogren et al. ............... 382/103 |
| 2008/0094205 A1* | 4/2008 | Thorn ........................ 340/539.1 |
| 2008/0208367 A1* | 8/2008 | Koehler et al. ................. 700/19 |
| 2008/0208864 A1 | 8/2008 | Cucerzan et al. |
| 2008/0228767 A1 | 9/2008 | Kenedy et al. |
| 2008/0243440 A1* | 10/2008 | Matsumoto et al. .......... 702/188 |
| 2009/0144075 A1 | 6/2009 | Flinn et al. |
| 2009/0156244 A1 | 6/2009 | Jabaud et al. |
| 2009/0157593 A1 | 6/2009 | Hayashi et al. |
| 2009/0171996 A1 | 7/2009 | Laxminarayanan |
| 2011/0080315 A1* | 4/2011 | Reilly et al. ................... 342/175 |
| 2012/0004782 A1* | 1/2012 | Koskan et al. ................ 700/291 |
| 2012/0092379 A1* | 4/2012 | Tsuji et al. ..................... 345/660 |
| 2012/0179742 A1* | 7/2012 | Acharya et al. ............... 709/202 |
| 2013/0144878 A1* | 6/2013 | James et al. ................... 707/736 |
| 2013/0204450 A1* | 8/2013 | Kagan et al. .................. 700/291 |
| 2013/0307972 A1* | 11/2013 | Stone et al. ................... 348/143 |
| 2013/0330055 A1* | 12/2013 | Zimmermann et al. ...... 386/240 |
| 2014/0025338 A1* | 1/2014 | Blount et al. ................. 702/183 |

FOREIGN PATENT DOCUMENTS

| | | |
|---|---|---|
| CN | 101183375 A | 5/2008 |
| WO | 0137097 A1 | 5/2001 |
| WO | 2009158492 A1 | 12/2009 |
| WO | 2010008685 A2 | 1/2010 |

* cited by examiner

*Primary Examiner* — Hung Le

(74) *Attorney, Agent, or Firm* — LeClairRyan, a Professional Corporation (57) ABSTRACT

A method, non-transitory computer readable medium, and data manager computing device comprises obtaining a plurality of entity profiles from one or more sources. The obtained plurality of entities are transformed to one or more standard formats. Further, the related and unrelated entity profiles are determined based on a comparison of the transformed entity profiles against each other and the determined related and unrelated entity profiles are provided.

18 Claims, 7 Drawing Sheets

ABCD EFG
Boston, MA
1/1/2100
/ABCD EFG/

IJK LMN
Chicago, IL
1/2/2101
/IJK LMN/

PQRS TUV
New York, NY
1/1/2000
/PQRS TUV/

XYZ ABC
New York, NY
1/1/2000
/PQRS TUV/

FIG. 4

Profile 1
Name: ABCD EFG
Address: Boston, MA
DOB: 1/1/2100
Signature: /ABCD EFG/

Profile 2
Name: IJK LMN
Address: Chicago, IL
DOB: 1/2/2101
Signature: /IJK LMN/

Profile 3
Name: PQRS TUV
Address: New York, NY
DOB: 1/1/2000
Signature: /PQRS TUV/

Profile 4
Name: XYZ ABC
Address: New York, NY
DOB: 1/1/2000
Signature: /PQRS TUV/

FIG. 5

Profile 1:

| Characteristics | Name | DOB | Address | Signature |
|---|---|---|---|---|
| Value | 10 | 20 | 30 | 40 |

Profile 2:

| Characteristics | Name | DOB | Address | Signature |
|---|---|---|---|---|
| Value | 50 | 60 | 70 | 80 |

Profile 3:

| Characteristics | Name | DOB | Address | Signature |
|---|---|---|---|---|
| Value | 100 | 110 | 120 | 130 |

Profile 4:

| Characteristics | Name | DOB | Address | Signature |
|---|---|---|---|---|
| Value | 140 | 110 | 120 | 130 |

FIG. 6

METHODS FOR IDENTIFYING UNIQUE ENTITIES ACROSS DATA SOURCES AND DEVICES THEREOF

This application claims the benefit of Indian Patent Application Filing No. 345/CHE/2013, filed Jan. 25, 2013, entitled "METHODS FOR IDENTIFYING UNIQUE ENTITIES ACROSS DATA SOURCES AND DEVICES THEREOF", which is hereby incorporated by reference in its entirety.

FIELD

This technology generally relates to identifying data, more particularly, to methods for identifying unique entities across data sources and devices thereof.

BACKGROUND

An entity is defined as something that is discrete and unique, such as an individual object, person, datum, or measurement. Additionally, an entity typically has several attributes which defines its profile. Further, each entity may exhibit different characteristics based on how it is sensed by an external observer, such as by a sensor, a human being, an animate object or other external sensing system. An observation by an observer or a sensor of an entity is recorded as the entity profile of the entity. Numerous entity profiles of a single entity based on the sensed attributes of the entity may be generated by different external observers or sensors. External observers or sensors act as sources as entity profiles.

Given the large number of entities and observers, a substantial amount of profile data and other information is created. Unfortunately, the task of identifying which of these entity profiles pertain to a particular entity and linking those profiles currently is a complex and time-consuming exercise.

SUMMARY

A method for identifying unique entities includes obtaining by a data management computing device a plurality of entity profiles from one or more sources. The obtained plurality of entity profiles are transformed to one or more standard formats by the data management computing device. The related and unrelated entity profiles are determined based on a comparison of the transformed entity profiles against each other by the data management computing device. The determined related and unrelated entity profiles are provided by the data management computing device.

A non-transitory computer readable medium having stored thereon instructions for identifying unique entities comprising machine executable code which when executed by at least one processor, causes the processor to perform steps includes obtaining a plurality of entity profiles from one or more sources. The obtained plurality of entities are transformed to one or more standard formats. Further, the related and unrelated entity profiles are determined based on a comparison of the transformed entity profiles against each other and the determined related and unrelated entity profiles are provided.

A data management computing device comprising one or more processors, a memory, wherein the memory coupled to the one or more processors which are configured to execute programmed instructions stored in the memory including obtaining a plurality of entity profiles from one or more sources. The obtained plurality of entities are transformed to one or more standard formats. Further, the related and unrelated entity profiles are determined based on a comparison of the transformed entity profiles against each other and the determined related and unrelated entity profiles are provided.

This technology provides a number of advantages including providing more effective methods for comparing entity profile data which have different parameters and/or are from different sources, a scoring mechanism that incorporates different types of entity parameters from plurality of sensor systems, ability to train the system and bootstrap using third party intelligence sources, non-transitory computer readable medium and devices for identifying unique entities, and identifying relationships between unique entities in untagged and unprocessed data. By transforming the data to a standard format, multiple profiles associated to a single entity can be easily and effectively identified. Additionally, the technology disclosed in this application could be applied across domains where different types of sensors are used for sensing various kinds of entities. Further by building a knowledge base, the technology disclosed in this application provides quicker and efficient ways of indentifying unique entities.

DETAILED DESCRIPTION

Figure 1:
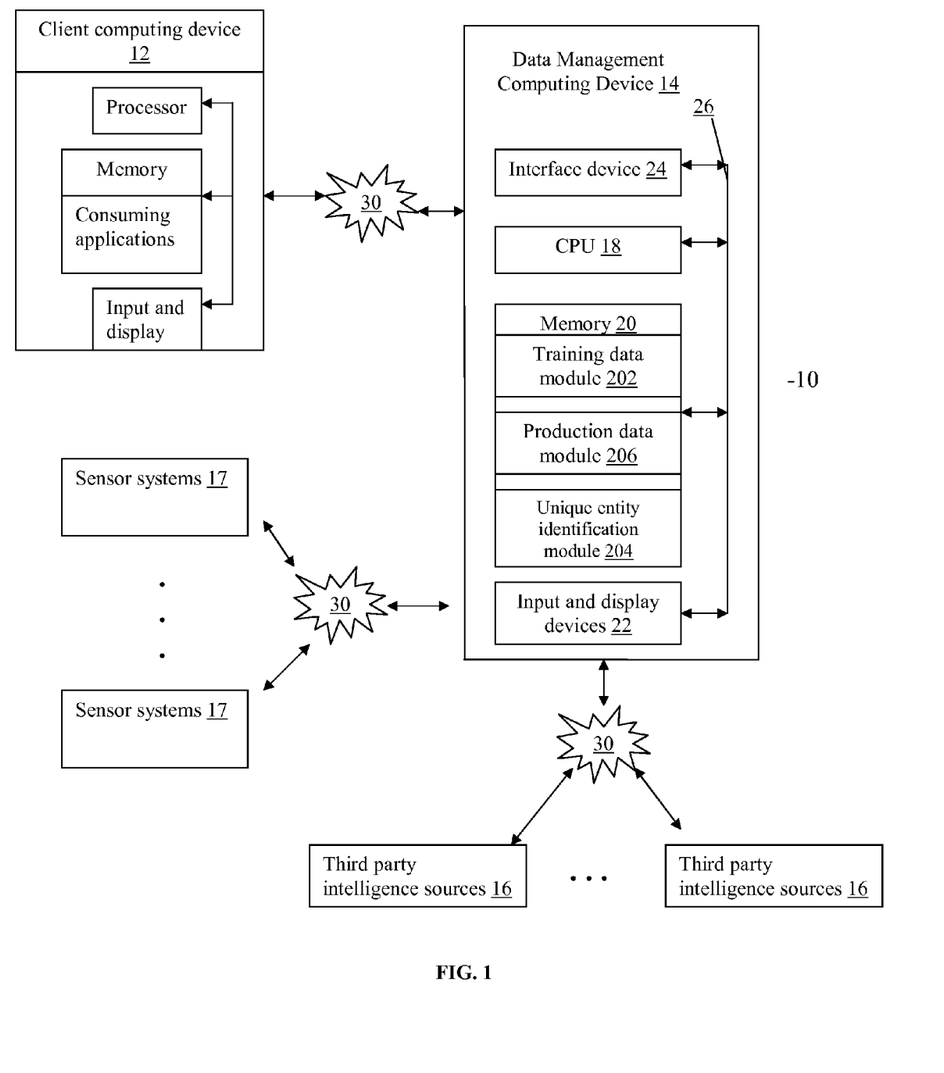
FIG. 1 is a block diagram of an exemplary environment with a data management computing device for identifying relationships between unique entities.
Figure 2:
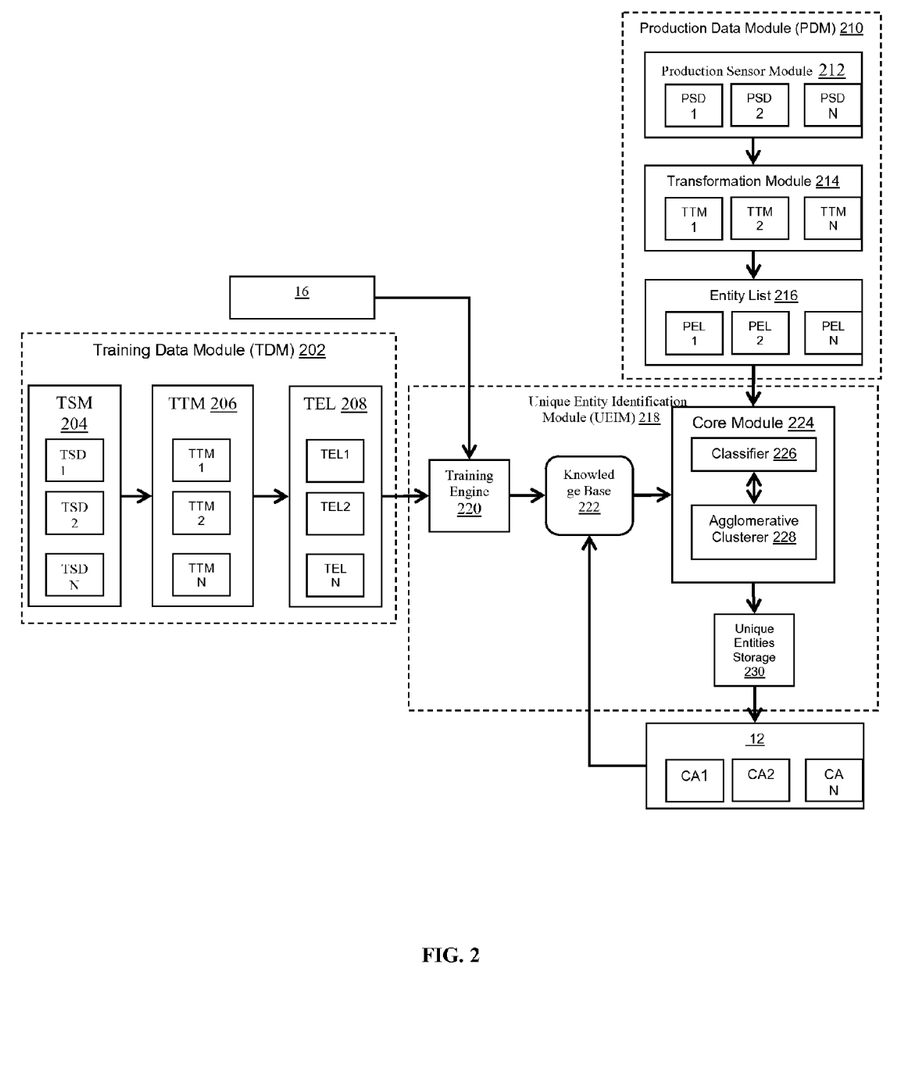
FIG. 2 is an exemplary functional block diagram of the exemplary environment with the data management computing device shown in FIG. 1.

An environment 10 with an exemplary data management computing device 14 for identifying unique entities is illustrated in FIGS. 1 and 2. The environment 10 includes a client computing device 12, the data management computing device 14, plurality of third party intelligence sources 16, a plurality of sensor systems 17 which are coupled together by communication network 30, although the environment can include other types and numbers of systems, devices, components, or elements in other topologies and deployments. This technology provides a number of advantages including providing more effective methods, non-transitory computer readable medium and devices for identifying relationships between unique entities in untagged and unprocessed data.

Referring more specifically to FIGS. 1 and 2, the data management computing device 14 is coupled to client computing device 12 through a communication network 30, which by way of example can be a local area network (LAN) or wide area network (WAN), although the client computing device 12 and data management computing device 14 may be connected together via other network topologies and network technologies. Additionally, the data management computing device 14 is coupled to the plurality of third party intelligence sources 16 and plurality of sensors systems 17 through a communication network 30, although the third party intelligence sources 16, the plurality of sensors systems 17 and the data management computing device 14 may be coupled together via other topologies.

The data management computing device 14 executes a number of operations including identifying unique entities as illustrated and described by way of the examples herein, although data management computing device 14 may perform other types and numbers of functions. The data management computing device 14 includes at least one CPU/processor 18, memory 20, input and display devices 22, and interface device 24 which are coupled together by bus 26, although data management computing device 14 may comprise other types and numbers of elements in other configurations.

The processor(s) 18 in the data management computing device 14 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®, ARM®).

Figure 3A:
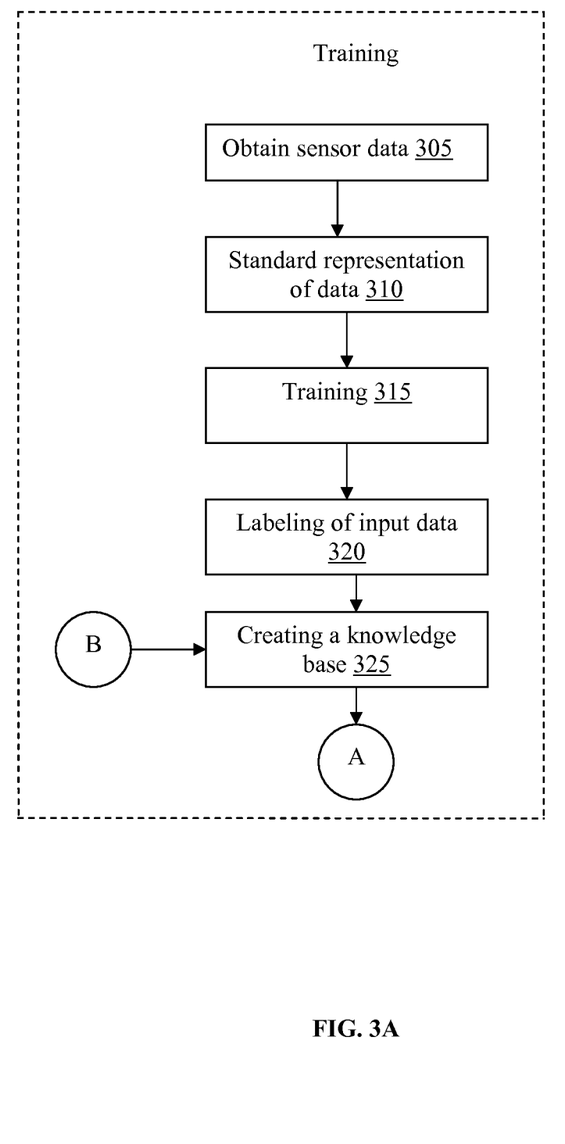
FIGS. 3A-3B are flow charts of an example of a method for identifying unique entities across data sources.
Figure 3B:
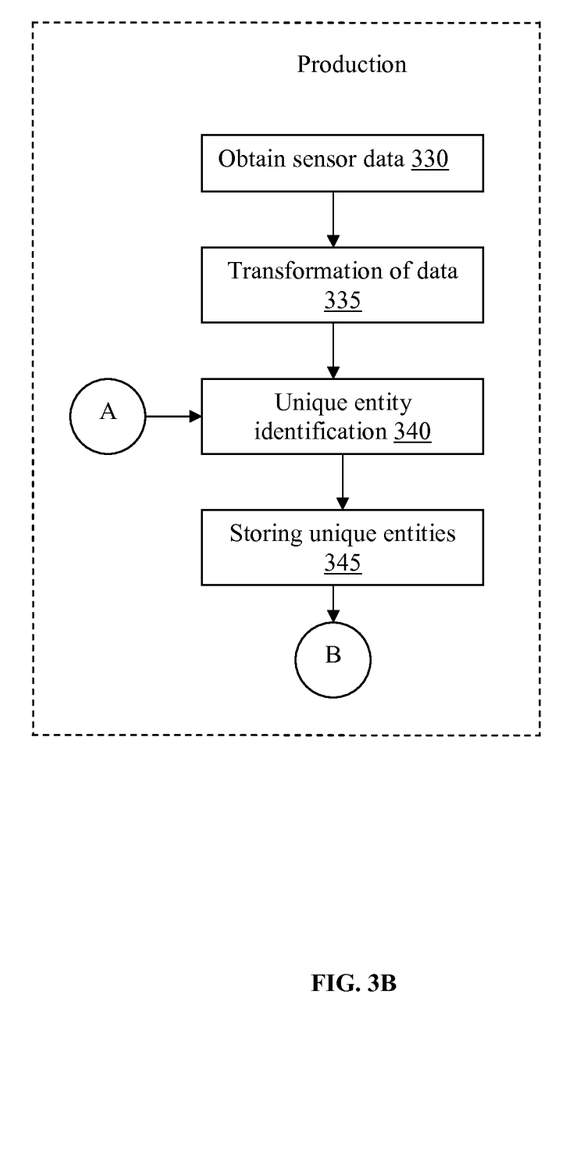
Figure 4:
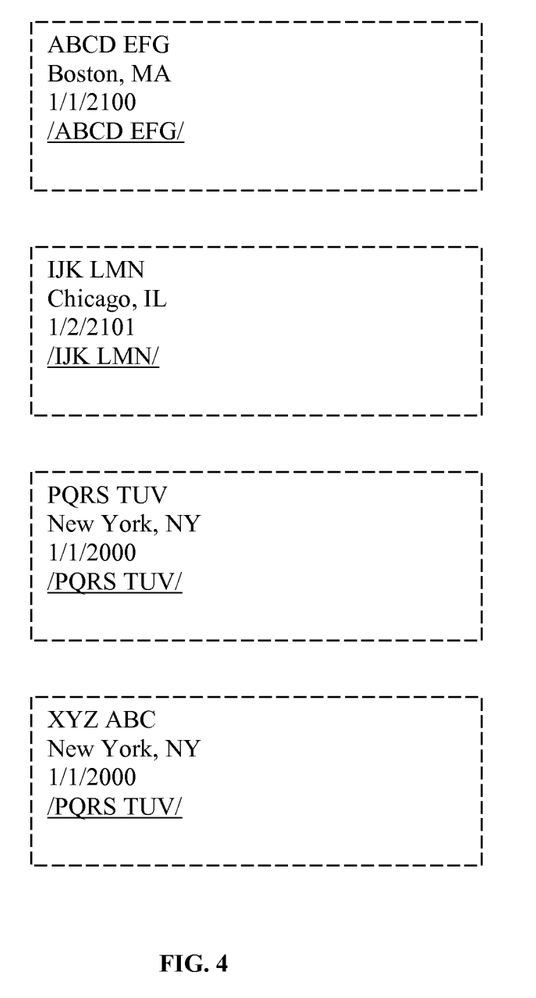
FIG. 4 is an illustration of exemplary unprocessed entity profiles.

The memory 20 in the data management computing device 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the one or more processor(s) 18. By way of example, the flow chart shown in FIG. 3A-3B is representative of steps or actions of this technology that may be embodied or expressed as one or more non-transitory computer or machine readable instructions stored in memory 20 that may be executed by the processor(s) 18.

Additionally, in this example the memory 20 includes a training data module 202, a production data module 210 and a unique entity identification module 218, although the memory 20 may include other types and numbers of modules with other types and numbers of functions which are executed in other orders and manners. With reference to FIG. 2, in this example the training data module (TDM) 202 further includes a training sensor module (TSM) 204 and a training transformation module (TTM) 206 and a Training Entity List (TEL) 208, although the training data module (TDM) 202 may include other types and numbers of modules as well as other types and numbers of lists or other data sets. The TDM 202 includes programmed instructions to assist with building the data set which is used in subsequent stages by the training engine (Engine) 220 of the unique entity identification module (UEIM) 218. The TDM 202 also includes programmed instructions to assist with obtaining the data from various different sensors, which are the plurality of sensor systems 17 in this example. The plurality of sensor systems 17 sense multiple entities to produce sensed data, which is herein referred to as the TSD1-TSDn, and is managed by the training sensor module (TSM) 204, although the TSM 204 can obtain the sensed data in other manners, such as from other types and numbers of sensors. The TTM 206 assists with transforming the sensed data (TSD1-TSDn) into a standard and uniform format. As it would be appreciated by a person of ordinary skill in the art, such a need arises as the sensed data (TSD1-TSDn) obtained from one or more of the plurality of sensor systems 17 may be of varying format or unstructured data. Next, following the transformation the TSD1-TSDn are labeled and stored as TEL in the Training Entity List (TEL) 208. Each TEL 208 comprises entity profiles of a particular sensor represented in a standard format, and has a label attached to it so that the Training Engine 220 knows in advance about how the entities are associated with their respective originating sensors.

Further, the memory 20 includes the production data module (PDM) 210. In this example, the PDM 210 includes production sensor module (PSM) 212 and production transformation module (PTM) 214. The PDM 210 includes programmed instructions to assist with building the data set in a production environment. The built data set is used in subsequent stages by the core module (CM) 224 of the unique entity identification module (UEIM) 218. The PDM 210 obtains the data from the plurality of sensor systems 17, although the PDM 210 can obtain sensed data about entities from other devices and in other manners. The PSM 212 senses multiple entities to produce sensor data, which is referred to herein as the PSD1-PSDn. The PTM 214 assists with transforming the sensed data into a standard and uniform format for the PDM 210. As it would be appreciated by one of ordinary skill in the art, such a need arises because of varying format and unstructured nature of the sensed data obtained from the different sensors or the plurality of sensor systems 17. Additionally, each PEL comprises entity profiles of a particular sensor represented in a standard format. However, the PTM 214 does not assign any label to these entity lists.

Next, the memory 20 also includes the unique entity identification module (UEIM) 218. The UEIM 218 includes programmed instructions and databases for a plurality of sub-modules, such as the Training Engine 220, the knowledge base 222, the core module (CM) 224 and the unique entities storage (UES) 230 as illustrated in FIG. 2. In this example, the Training Engine 220 accepts the TEL1-TELn as inputs from the TDM 202 as well as other data from one or more third part intelligence sources 16 and executes programmed instructions illustrated and described herein to build the knowledge base 222. In this example, the knowledge base 222 primarily comprises information on similarities and differences between the various entity profiles, TEL although the knowledge base 222 can include other types and amounts of any additional information, such as additional information from one or more of the third party intelligence sources 16. By way of example only, given a pair of matching entities, the UEIM 218 records the distance for the various attributes between the two matching entities. Further, the UEIM 218 also records the distances for the attributes for non-matching entities. The recorded distances are stored as a trained model in the knowledge base 222. The CM 224 further includes two sub-modules, the classifier (CL) 226 and the agglomerative clusterer (AC) 228, although the CM 224 can include other types and numbers of modules as well as other types and numbers of databases. In this example, the CM 224 accepts input from the PDM 210 and the knowledge base 222. The CM 224 also assists with processing the input entity profiles, such as the TEL and the PEL1-PELn to identify the unique entities present in them. The CM 224 uses the CL 226 and the AC 228 to determine the unique entities. By way of example only, a support vector machine (SVM) can be used as a binary classifier. Once the CM 224 accepts the PEL1-PELn from the PDM 210, it takes every pair of entities from the PEL 216 and inputs it to the CL 226. The CL 226 determines if the two entities that are input to it are matching or non-matching entities based on the information stored in the knowledge base 222. This process of determining if a pair of entities is matching or non-matching, is repeated for all input pairs of entities from the PEL 216. Next, the unique entities storage (UES) 230 is the storage for storing the unique entities identified in the previous step by the CM 224. Any form of intelligence or knowledge generated as a result of analysis done in the CM 224 module is fed back into the knowledge base 222 of the UEIM 218.

Now referring back to FIG. 1, the input and display devices 22 enable a user, such as an administrator, to interact with the data management computing device 14, such as to input and/or view data and/or to configure, program and/or operate it by way of example only. Input devices may include a keyboard and/or a computer mouse and/or touch screen devices and display devices may include a computer monitor and/or touch screen devices, although other types and numbers of input devices and display devices could be used.

The interface device 24 in the data management computing device 14 is used to operatively couple and communicate between the data management computing device 14, the client computing device 12, the plurality of third party intelligence sources 16 and the plurality of sensor systems 17 which are all coupled together by the communication network 30, although other types and numbers of communication networks or systems with other types and numbers of connections and configurations to other devices and elements. By way of example only, the communication network including LAN or WAN can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

The client computing device 12, the plurality of third party intelligence sources 16 and the sensor systems 17 include a central processing unit (CPU) or processor, a memory, an interface device, and an I/O system, which are coupled together by a bus or other link, although other numbers and types of network devices could be used.

The client computing device 12 is coupled to the data management computing device 14 via the communication network 30. Further, the client computing device 12 may run one or more consuming applications, which are herein referred to as the CA1-CAn as illustrated in FIG. 2. The consuming applications executing within the client computing devices 12 accepts the various unique entities identified by the CM 224 as inputs from the UES 230 and then further uses these entities in various different applications. By way of example only, the consuming applications could be consumer facing applications, such as user-interfaces, an analytics application or even various kinds of data stores.

Generally, the plurality of third party intelligence sources 16 communicates with the data management computing device 14 via the communication network 30 according to the HTTP-based application RFC protocol or the CIFS or NFS protocol in this example, but the principles discussed herein are not limited to this example and can include other application protocols. A series of applications may run on the plurality of third party sources 16 that allow the transmission of data, such as a data file or metadata additional information to the data management computing device 14 to build the knowledge base 222 present within the memory 20 or the assist with indentifying unique entities. It is to be understood that the plurality of third party intelligent sources 16 may be hardware or software or may represent a system with multiple third party sources 16, which may include internal or external networks. In this example the third party intelligence sources 16 may be any version of Microsoft® IIS servers or Apache® servers, although other types of servers may be used.

Further in FIG. 1, the plurality of sensor systems 17 are coupled with the data management computing device 14 via the communication network 30. By way of example only, the plurality of sensor systems 17 can be one or more of a video camera, microphones, radars, and motion sensors. The plurality of sensor systems 17 observes, obtain and sends entity profile information to the data management computing device 14, although the plurality of sensors can perform other types and numbers of functions. Further, in this technology, the plurality of sensor systems 17 can identify activities, information or attributes about one or more entities. By way of example only, in the context of the conference room setting or the security system setting, a microphone which is one of the plurality of sensor systems 17 is able to sense voice related attributes such as the signal strength, distance measures of the entity from the microphone and the actual voice related attributes such as frequency, speech patterns, etc. In another example, the camera which is, one of the pluralities of sensor systems 17, senses attributes of entities such as the picture, distance, background and similar attributes. In yet another example of the present technology, in the context of a social media group setting, through the provision of capturing the various attributes of an entity using its input fields, one of the plurality of sensor systems 17 can senses the various demographic and other details of an entity, which is people in this context, such as work, email, birthday, education or digital signature.

Although in FIGS. 1 and 2 the client computing device 12, the data management computing device 14, the plurality of third party intelligence sources 16, the plurality of sensor systems 17, communication network 30 are described and illustrated herein, other types and numbers of systems, devices, components, or other elements in other topologies can be used. It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, parallel computer, cluster computers, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for identifying relationships between unique entities across data sources will now be described with reference to FIGS. 1-6. Referring more specifically to FIG. 3A, exemplary steps involved wherein the data management computing device 14 trains itself to identify unique entities across data sources. In step 305, the data management computing device 14 obtains untagged entity profiles from one or more sources, such as the plurality of sensor systems 17, although the data management computing device 14 can obtain the entity profile information from other types and numbers of sources and/or locations. By way of example only, the one or more entity profiles relate to user profiles, sound recordings, video recordings, or images, although the one or more entity profiles can include other types and amounts of information and other data. In this example, untagged information relates to unstructured or unprocessed information, although other types of information, such as tagged data, could be used. Further, by way of example an entity may be a human, an animal, a plant, a place, a machine, an item of machinery, measurements, data, or other captured signals, although other types and numbers of entities could be identified with this exemplary technology. For purposes of illustration only, in this particular example, the entities each relate to a particular human person and the one or more entity profiles relates to various user data profiles which are obtained by the plurality of sensor systems 17 as illustrated in the diagrams in FIG. 4.

Optionally, upon obtaining the entity profiles, the data management computing device 14 can process each of the obtained one or more entity profiles to identify one or more entity profile characteristics associated with each of the obtained entity profiles. By way of example only, the one or more entity profile characteristics may relate to name, date of birth, signature, digital signature, appearance in a photo or a video, or voice tone, although the one or more entity profile characteristics can relate to other types and numbers of characteristics of the obtained one or more entity profiles. In this particular illustrative example, the one or more entity profile characteristics relates to the user's name, user's date of birth, user's address and user's digital signature as illustrated in the diagrams in FIG. 5. However, in another example, the data management computing device 14 can directly obtain the characteristics of the one or more entity profiles from the plurality of sensor systems 17 or other sources.

Figure 6:
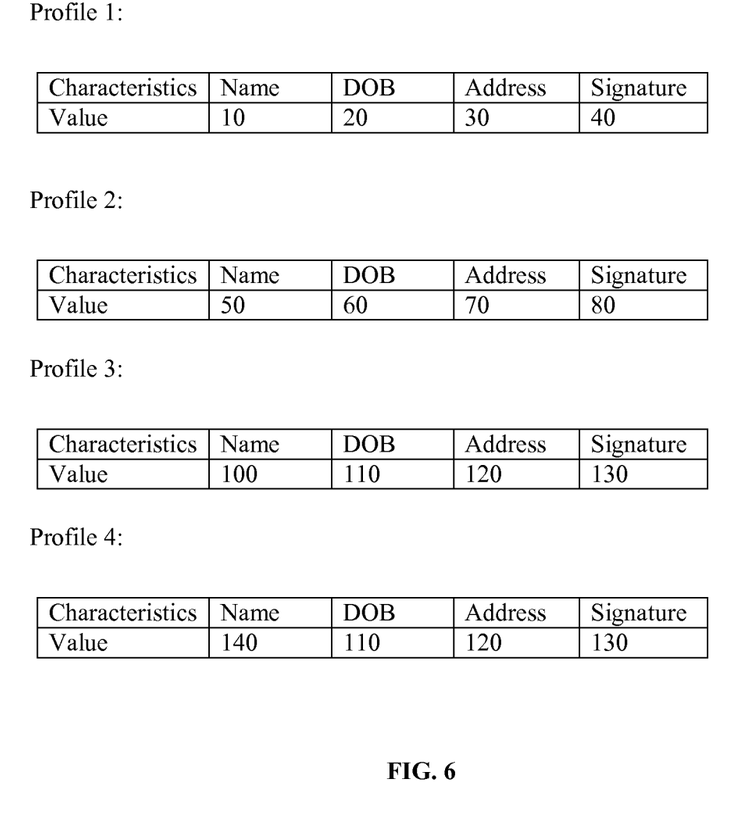
FIG. 6 is an illustration of an exemplary single dimension matrix.

Next in step 310, the data management computing device 14 transforms the obtained entity profiles to a standard representation format. By way of example only, the standard format relates to a computational representation of each of the entity profiles as illustrated in FIG. 6. By way of example only, the computational representation is in the form of vector points in a multidimensional space, such as a single dimension matrix, in a numerical format although the computational representation can be in other forms or can be represented using a multi-dimensional matrix. As it would be appreciated by one of ordinary skill in the art, it is required for the data management computing device 14 to represent the obtained entity profiles in a standard format as the obtained entity profiles may be in different or unstructured data formats.

In step 315, the data management computing device 14 executes programmed instructions to trains itself to identify the unique entities in the entity profiles which have been represented in a standard format. By way of example only, the data management computing device 14 compares at least one entity of the transformed one or more entity profiles with each of the other remaining transformed one or more entity profiles to identify the unique entities, although the data management computing device 14 may use other types and numbers of techniques or methods to identify the unique entities.

As it would be appreciated by one of ordinary skill in the art, the data management computing device 14 compares all entity profile characteristics of one entity with all the entity profile characteristics of each of the remaining entity profiles. By way of example only, the entity profile characteristics for each of the entity profiles can be dissimilar, although there may be entity profiles which have similar entity profile characteristics.

Further, in this example by comparing, the data management computing device 14 is able to determine a distance value between compared entity profiles as illustrated in FIG. 6. Optionally, the data management computing device 14 can store the calculated distance within the memory 20 for subsequent learning purposes, although this information can be stored in other locations.

Next, the data management computing device 14 generates a match value based on the calculated distance between the vector points in multidimensional space, although the data management computing device 14 can generate the match value using other types and numbers of methods. Once the match value is generated, the data management computing device 14 determines if the generated match value is less than a threshold match value. If the data management computing device 14 determines that the generated match value is less than the threshold value, then the data management computing device 14 identifies the matching entity profiles as related entity profiles.

However, if the data management computing device 14 determines that the generated match value is equal to or greater than the threshold value, then the data management computing device 14 identifies the entity profile and the compared entity profiles as unrelated entity profiles.

Next in step 320, the data management computing device 14 assigns a first label to the compared profile to indicate the compared profile is related to another entity profile, although other manners for marking or otherwise labeling related entity profiles could be used. Further, the data management computing device assigns a second label to the compared entity profiles which are identified as being unrelated to any other entity profiles.

In step 325, the data management computing device builds a knowledge base 222 and stores the knowledge base 222 within the memory 20 as previously illustrated. As it would be appreciated by one of ordinary skill in the art, the data management computing device 14 stores all the information illustrated in the previous steps, such as the comparison and the calculated distance by way of example only, although the data management computing device 14 can store other types and amounts of information. By creating the knowledge base, the data management computing device 14 ensures quicker and accurate identification of unique entities among data sources for all the subsequent requests to identify the unique entities.

Referring to FIG. 3B, an exemplary method for using the knowledge base created in the previously illustrated steps in FIG. 3A to identify unique entities in a production environment is illustrated. In step 330, the data management computing device 14 obtains entity profiles from the plurality of sensor systems 17 using one or more of the techniques previously illustrated and described with reference to step 305.

In step 335, the obtained entity profiles are transformed by the data management computing device 14 to a standard representation techniques previously illustrated and described with reference to step 310.

In step 340, the data management computing device 14 identifies unique entities in the transformed entity profiles using the information present in the knowledge base 222 created in step 325 and may also use additional information obtained from the third party intelligence sources 17, although the data management computing device 14 can identify the entity profiles using any other techniques. Alternatively, the data management computing device 14 may use the techniques previously illustrated and described with reference to step 315 to identify unique entities.

Figure 5:
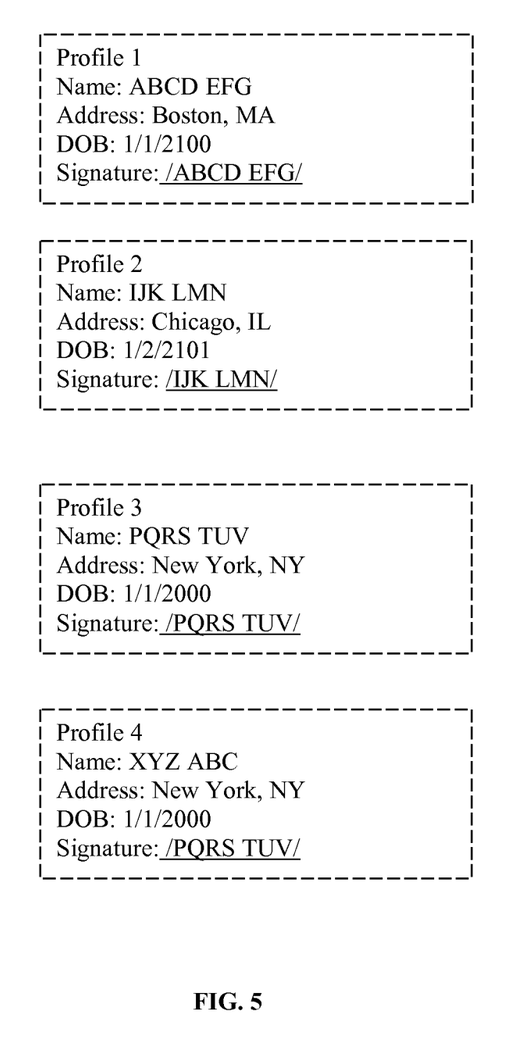
FIG. 5 is an illustration of exemplary processed entity profiles.

As it would be appreciated by one of ordinary skill in the art, in this example, profile 3 and profile 4 of FIG. 5 are identified as one or more related entity profiles and accordingly profile 3 is identified as the unique entity to have multiple profiles 3 and 4, even though the names in each profile are different and profile 1 and profile 2 of FIG. 5 are identified as unrelated entity profiles and accordingly, profile 1 and profile 2 are identified as two separate unique entities.

Next in step 345, the data management computing device 14 stores the unique entities within the memory 20, although the data management computing device 14 can store the unique entities at any other memory locations. Optionally, the data management computing device 14 separately clusters each of the identified related entity profiles and the identified unrelated entity profiles to store within the memory 20, although the data management computing device 14 can store the identified entity profiles at other locations and in other manners. In another example, the data management computing device 14 can store the identified related entity profiles and the identified unrelated entity profiles at different memory locations. The stored identified related entity profiles and the stored identified unrelated entity could be used for further analysis by the client computing device 12, although the stored entity profiles can be used by any other devices for any other purposes.

Optionally, the data management computing device 14 generates a report including the identified related entity profiles and the identified unrelated entity profiles and the unique entity profiles, although the data management computing device 14 can generate separate reports for the identified related entity profiles and the identified unrelated entity profiles and the unique entity profiles. By way of example only, the data management computing device 14 may provide the generated report to the client computing device 12 for any further analysis.

Next, the data management computing device 14 can proceed from step 345 in FIG. 3B back to step 325 in FIG. 3A to update the knowledge base 222 with information based on the results obtained back in step 340 and then in this particular example the process can continue to process additional new entity profiles or end.

Accordingly, as illustrated with the example herein, this technology provides more effective methods, non-transitory computer readable medium and devices for identifying relationships between unique entities in untagged and unprocessed data. By transforming the data to a standard format, multiple profiles associated to a single entity can be more easily and effectively identified.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for identifying one or more unique entities comprising:
    obtaining by a data management computing device a plurality of entity profiles from one or more sources;
    transforming by the data management computing device each of the entity profiles to one or more standard formats;
    determining by the data management computing device which of the entity profiles are related and unrelated based on a comparison of the transformed entity profiles against each other;
    providing by the data management computing device the determination of which of the plurality of entity profiles are related and which are unrelated; and
    identifying by the data management computing device the one or more unique entities based on the providing, each of the one or more unique entities including multiple related entity profiles and each of the plurality of unrelated entity profiles being considered as separate unique entities.

2. The method as set forth in claim 1 further comprising identifying by the data management computing device one or more entity profile characteristics associated with each of the plurality of entity profiles.

3. The method as set forth in claim 1 further comprising assigning by the data management computing device a first label to the entity profiles determined to be related and a second label to the entity profiles determined to be unrelated.

4. The method as set forth in claim 1 further comprising storing by the data management computing device the entity profiles determined to be related and the entity profiles determined to be unrelated upon separately clustering the entity profiles determined to be related and the entity profiles.

5. The method as set forth in claim 1 wherein the determining further comprises: comparing by the data management computing device the entity profiles against each of the other entity profiles in standard format to determine a distance value between the compared entity profiles;
    generating by the data management computing device a match value for each of the comparisons using the determined distance value; and
    comparing by the data management computing device the match value and a threshold match value to determine which of the plurality of entity profiles are related and unrelated.

6. The method as set forth in claim 5 wherein the comparing the match value and the threshold match value further comprises:
    determining by the data management computing device the entity profiles to be related when the match value is below the threshold match value; and
    determining by the data management computing device the entity profiles to be unrelated when the match value is equal or greater than the threshold match value.

7. A non-transitory computer readable medium having stored thereon instructions for identifying one or more unique entities comprising machine executable code which when executed by at least one processor, causes the processor to perform steps comprising:
    obtaining a plurality of entity profiles from one or more sources;
    transforming each of the entity profiles to one or more standard formats;
    determining which of the entity profiles are related and unrelated based on a comparison of the transformed entity profiles against each other;
    providing the determination of which of the plurality of entity profiles are related and which are unrelated and;
    identifying by the data management computing device the one or more unique entities based on the providing, each of the one or more unique entities including multiple related entity profiles and each of the plurality of unrelated entity profiles being considered as separate unique entities.

8. The medium as set forth in claim 7 further comprising identifying one or more entity profile characteristics associated with each of the plurality of entity profiles.

9. The medium as set forth in claim 7 further comprising assigning a first label to the entity profiles determined to be related and a second label to the entity profiles determined to be unrelated.

10. The medium as set forth in claim 7 further comprising storing the entity profiles determined to be related and the entity profiles determined to be unrelated upon separately clustering the entity profiles determined to be related and the entity profiles.

11. The medium as set forth in claim 7 wherein the determining further comprises: comparing the entity profiles against each of the other entity profiles in standard format to determine a distance value between the compared entity profiles;
  generating a match value for each of the comparisons using the determined distance value; and
  comparing the match value and a threshold match value to determine which of the plurality of entity profiles are related and unrelated.

12. The medium as set forth in claim 11 wherein the comparing the match value and the threshold match value further comprises:
  determining the entity profiles to be related when the match value is below the threshold match value; and
  determining the entity profiles to be unrelated when the match value is equal or greater than the threshold match value.

13. A data management computing device comprising:
  one or more processors;
  a memory, wherein the memory coupled to the one or more processors which are configured to execute programmed instructions stored in the memory comprising: obtaining a plurality of entity profiles from one or more sources;
  transforming each of the entity profiles to one or more standard formats;
  determining which of the entity profiles are related and unrelated based on a comparison of the transformed entity profiles against each other;
  providing the determination of which of the plurality of entity profiles are related and which are unrelated; and
  identifying by the data management computing device the one or more unique entities based on the providing, each of the one or more unique entities including multiple related entity profiles and each of the plurality of unrelated entity profiles being considered as separate unique entities.

14. The device as set forth in claim 13 wherein the one or more processors is further configured to execute programmed instructions stored in the memory further comprising identifying one or more entity profile characteristics associated with each of the plurality of entity profiles.

15. The device as set forth in claim 13 wherein the one or more processors is further configured to execute programmed instructions stored in the memory further comprising assigning a first label to the entity profiles determined to be related and a second label to the entity profiles determined to be unrelated.

16. The device as set forth in claim 13 wherein the one or more processors is further configured to execute programmed instructions stored in the memory further comprising storing the entity profiles determined to be related and the entity profiles determined to be unrelated upon separately clustering the entity profiles determined to be related and the entity profiles.

17. The device as set forth in claim 13 wherein the one or more processors is further configured to execute programmed instructions stored in the memory for the determining further comprises:
  comparing the entity profiles against each of the other entity profiles in standard format to determine a distance value between the compared entity profiles;
  generating a match value for each of the comparisons using the determined distance value; and
  comparing the match value and a threshold match value to determine which of the plurality of entity profiles are related and unrelated.

18. The device as set forth in claim 13 wherein the one or more processors is further configured to execute programmed instructions stored in the memory for the comparing the match value and the threshold match value further comprises:
  determining the entity profiles to be related when the match value is below the threshold match value; and
  determining the entity profiles to be unrelated when the match value is equal or greater than the threshold match value.

* * * * *